(12) United States Patent
Whipple et al.

(10) Patent No.: US 8,825,832 B2
(45) Date of Patent: Sep. 2, 2014

(54) METHOD AND SYSTEM FOR MANAGING CONNECTIONS

(75) Inventors: William R. Whipple, Magnolia, TX (US); Anthony M. Camilli, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2528 days.

(21) Appl. No.: 10/897,338

(22) Filed: Jul. 21, 2004

(65) Prior Publication Data

US 2006/0020698 A1  Jan. 26, 2006

(51) Int. Cl.
*G06F 15/16* (2006.01)

(52) U.S. Cl.
USPC .......................... 709/224; 709/231; 709/245

(58) Field of Classification Search
USPC ........................................................ 709/224
See application file for complete search history.

(56) References Cited

U.S. PATENT DOCUMENTS

| | | | | |
|---|---|---|---|---|
| 3,932,844 A * | 1/1976 | Yokoo | | 340/2.26 |
| 5,371,852 A * | 12/1994 | Attanasio et al. | | 709/245 |
| 5,444,848 A * | 8/1995 | Johnson et al. | | 709/241 |
| 5,519,690 A * | 5/1996 | Suzuka et al. | | 370/395.3 |
| 5,617,417 A * | 4/1997 | Sathe et al. | | 370/394 |
| 5,652,908 A | 7/1997 | Douglas et al. | | |
| 5,774,660 A * | 6/1998 | Brendel et al. | | 709/201 |
| 5,917,997 A * | 6/1999 | Bell et al. | | 714/4 |
| 6,009,535 A | 12/1999 | Halligan et al. | | |
| 6,052,733 A * | 4/2000 | Mahalingam et al. | | 709/235 |
| 6,065,073 A * | 5/2000 | Booth | | 710/46 |
| 6,078,957 A | 6/2000 | Adelman et al. | | |
| 6,173,311 B1 | 1/2001 | Hassett et al. | | |
| 6,173,411 B1 * | 1/2001 | Hirst et al. | | 714/4 |
| 6,176,733 B1 | 1/2001 | Coile et al. | | |
| 6,285,656 B1 | 9/2001 | Chaganty et al. | | |
| 6,308,282 B1 * | 10/2001 | Huang et al. | | 714/4 |
| 6,314,525 B1 * | 11/2001 | Mahalingham et al. | | 714/4 |
| 6,324,161 B1 * | 11/2001 | Kirch | | 370/217 |
| 6,366,558 B1 | 4/2002 | Howes et al. | | |
| 6,389,448 B1 * | 5/2002 | Primak et al. | | 718/105 |
| 6,438,705 B1 * | 8/2002 | Chao et al. | | 714/4 |
| 6,445,704 B1 * | 9/2002 | Howes et al. | | 370/392 |
| 6,493,348 B1 * | 12/2002 | Gelman et al. | | 370/401 |
| 6,704,812 B2 | 3/2004 | Bakke et al. | | |
| 6,718,383 B1 | 4/2004 | Hebert | | |
| 6,728,780 B1 | 4/2004 | Hebert | | |
| 6,732,186 B1 * | 5/2004 | Hebert | | 709/239 |
| 6,836,275 B1 * | 12/2004 | Arquie et al. | | 715/734 |
| 6,865,180 B1 * | 3/2005 | Waespe | | 370/360 |
| 6,978,346 B2 * | 12/2005 | Baek et al. | | 711/114 |
| 7,308,512 B1 * | 12/2007 | Son | | 710/38 |

(Continued)

OTHER PUBLICATIONS

Ayala, Roland, "Windows-based Terminal Shell," Software Compatibility Guide, v1.0, Status: Final, pp. 1-27.

(Continued)

*Primary Examiner* — Tauqir Hussain

(57) ABSTRACT

According to one embodiment, a method for managing a plurality of connections is provided. The method comprises grouping a plurality of connections to form at least two connection groups, where each connection is associated with a communication service and each connection group comprises a first connection and at least one failover connection operable to establish a new communication service if the communication service associated with the first connection fails; and associating the at least two connection groups with a user identifier.

23 Claims, 4 Drawing Sheets

(56) References Cited

U.S. PATENT DOCUMENTS

| | | | | |
|---|---|---|---|---|
| 2001/0049717 A1* | 12/2001 | Freeman et al. | ............... | 709/203 |
| 2002/0071437 A1* | 6/2002 | Nishikado et al. | ....... | 370/395.63 |
| 2005/0021751 A1* | 1/2005 | Block et al. | ................... | 709/225 |
| 2005/0066060 A1* | 3/2005 | Pinkerton et al. | ............. | 709/249 |
| 2005/0091388 A1* | 4/2005 | Kamboh et al. | ............. | 709/228 |
| 2005/0132074 A1* | 6/2005 | Jones et al. | ................... | 709/229 |
| 2005/0270986 A1* | 12/2005 | Watanabe et al. | ............. | 370/252 |
| 2008/0301278 A1* | 12/2008 | Jones et al. | ................... | 709/223 |
| 2009/0097490 A1* | 4/2009 | Sanderson et al. | ....... | 370/395.53 |

OTHER PUBLICATIONS

Microsoft Corporation, "System Design Guide for Windows-based Terminal," A Technical Reference for Designing Microsoft®, Windows®-based Terminals for the Microsoft Terminal Server, Microsoft Confidential Information, Version 1.0, Publication Date: Aug. 4, 1998, pp. 1-56.

Microsoft Corporation, "Remote Desktaop Protocol 5.0 for Windows CE 2.12," A Technical Reference for Including RDP 5.0 in a Windows CE 2.12 configuration, Microsoft Confidential Information, Version 1.0, Publication Date: Feb. 21, 2000, pp. 1-31.

Microsoft Corporation, "System Reference Guide for Windows-based Terminal", A Technical Reference for Designing a Microsoft® Windows®-based Terminal for the Microsoft Windows 2000® Terminal Server, Microsoft Confidential Information, Version 1.6, Publication Date: Mar. 2000, pp. 1-73.

Wyse, New CE .NET 4.2 gives you unique options—and makes your users more productive!, Wyse, WY, and WyseWorks are registered trademarks, and the Wyse logo, Winterm logo, Wyse, and Winterm and trademarks of Wyse Technology Inc., 3471 N. First St., San Jose, CA. 95134, Apr. 1, 2004, Message, p. 1 of 1.

* cited by examiner

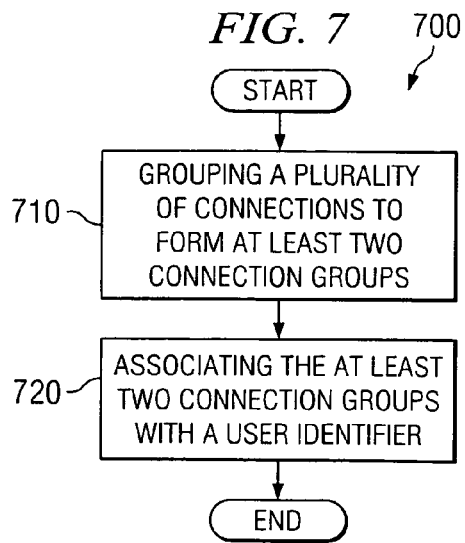
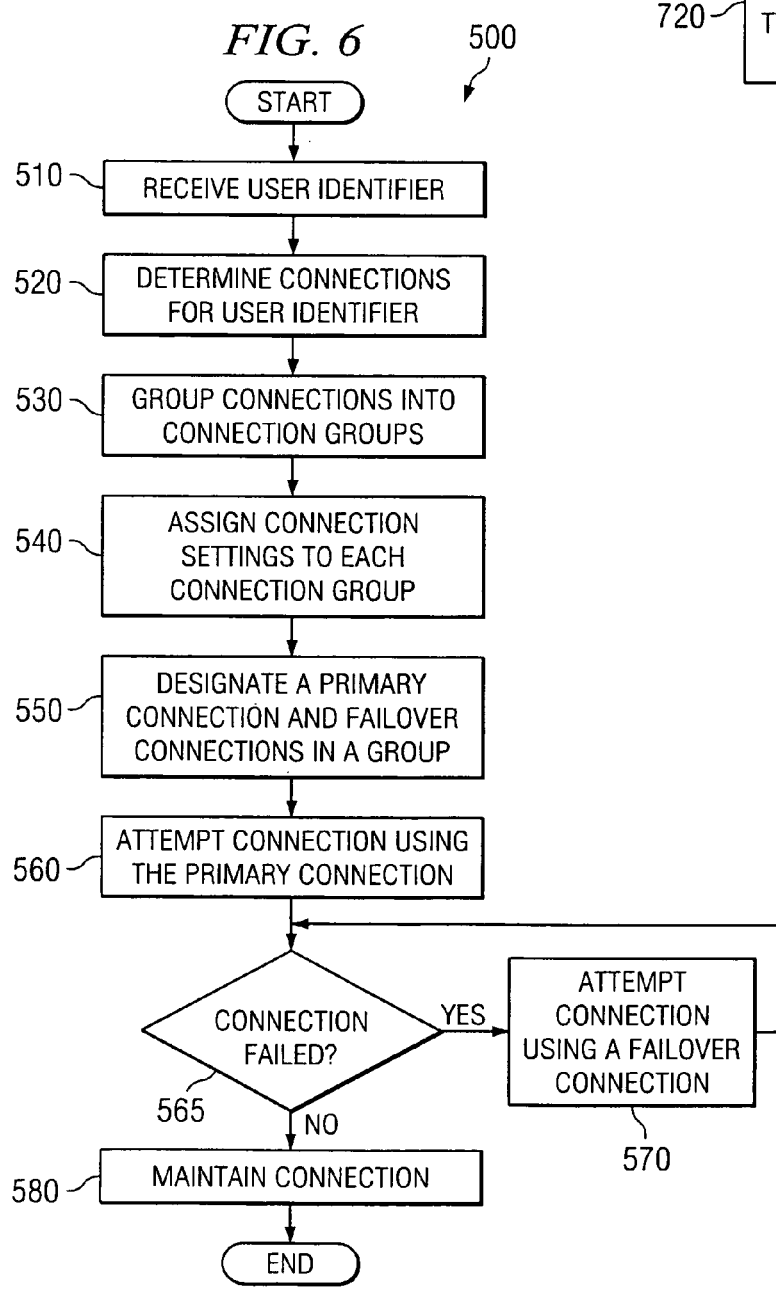

METHOD AND SYSTEM FOR MANAGING CONNECTIONS

BACKGROUND OF THE INVENTION

In general, thin clients refer to devices and software that request applications and/or files from another computing device, such as a server. A thin-client device is typically a processor based device that is equipped with minimal hardware and software, hence the term "thin". To request applications and/or files, the thin client connects to an applications server using a predefined connection. One technique for managing the connection in a thin client involves assigning a single predefined connection to a user. Another technique for managing the connection involves using a failover connection. A failover connection may be designated as a connection that a thin-client device may use to connect to a server if a primary connection fails. Using failover connections has typically been associated with a single connection group. That is, the thin client would be configured with a single connection group, where at least one connection in that group is a failover connection. These techniques, however, may limit the ability of an administrator to manage connections for users in a manner that provides reliable and multiple connections. For example, a thin client has been limited to connecting with the server either using a single predefined connection with one or more failover connections associated with that connection, or using multiple concurrent connections.

Additionally, managing a connection for a thin-client has typically not taken into consideration the activities of the user. For example, the thin-client generally attempts to establish a connection to a server regardless of whether the user needs the connection at that particular time. This technique for managing a connection, however, may result in tying up server resources unnecessarily. This practice may also result in higher cost of network operations because more connections than necessary may need to be supported. Consequently, known techniques for managing connections are inadequate in certain situations.

BRIEF SUMMARY OF THE INVENTION

According to one embodiment, a method for managing a plurality of connections is provided. The method comprises grouping a plurality of connections to form a at least two connection groups, each connection associated with a communication service and each connection group comprising a first connection and at least one failover connection operable to establish a new communication service if the communication service associated with the first connection fails, and associating the at least two connection groups with a user identifier.

According to another embodiment, a system for managing a plurality of connections is provided. The system comprises a plurality of connections comprising a plurality of connection groups, each connection associated with a communication service and each connection group comprising a first connection and at least one failover connection operable to establish a new communication service if the communication service associated with the first connection fails, and a connection association operable to associate at least two connection groups with a user identifier.

According to yet another embodiment, a connection administration module is provided. The connection administration module comprises means for grouping a plurality of connections to form at least two connection groups, each connection associated with a communication service and each connection group comprising a primary connection and a plurality of failover connections operable to establish a new communication service if the communication service associated with the first connection fails; and means for associating at least two connection groups with a user identifier.

According to yet another embodiment, a system for managing a plurality of connections is provided. The system comprises at least one server operable to provide data services to a plurality of users; and at least one client comprising a plurality of connections for communicatively coupling to the at least one server, the plurality of connections grouped into at least two connection groups where each connection group comprises a primary connection and at least one failover connection.

BRIEF DESCRIPTION OF THE DRAWINGS

FIG. 6 is a flowchart illustrating the operational flow of another embodiment for managing connections using a connection administration module.

FIG. 7 is a flowchart illustrating the operational flow of another embodiment for managing connections using a connection administration module.

DETAILED DESCRIPTION OF THE INVENTION

Figure 1:
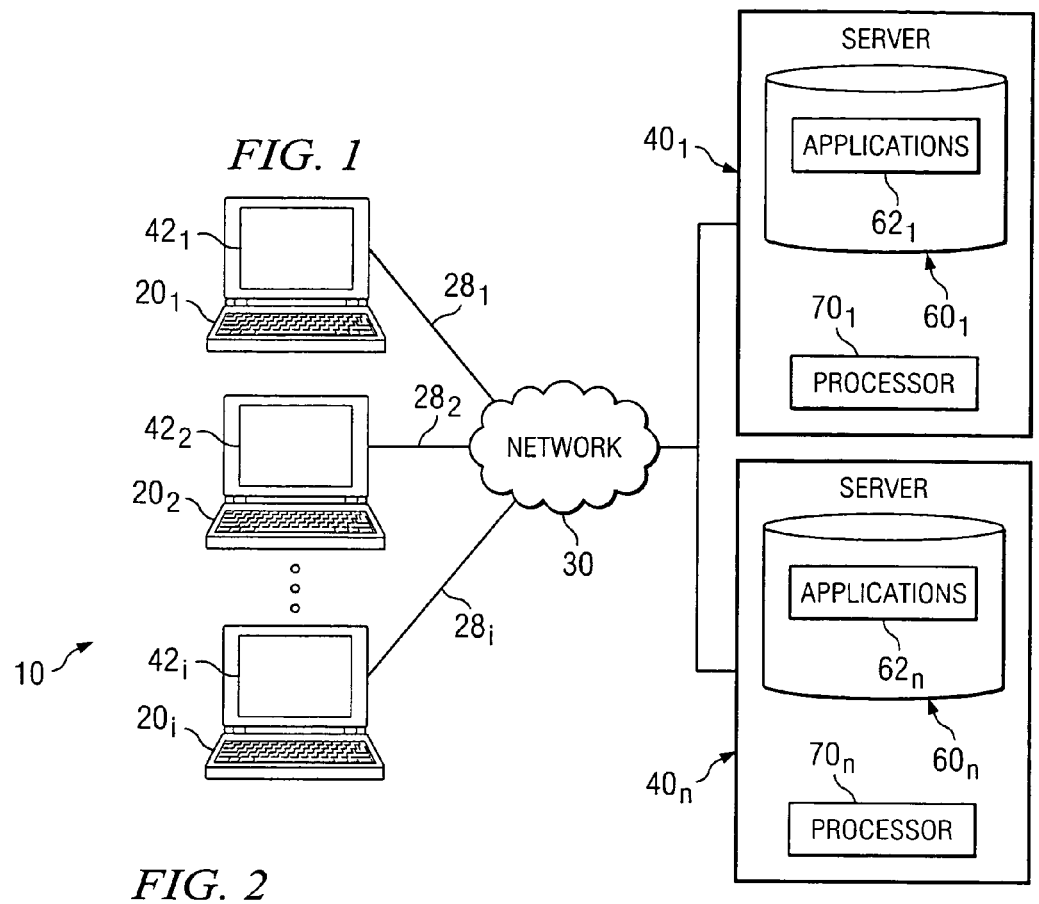
FIG. 1 is a block diagram illustrating an embodiment of a system for managing connections using a multi-connection to multi-failover connection administration module.

FIG. 1 is a block diagram illustrating a system 10 for managing connections using multi-connection and multi-failover connection administration modules $42_1, 42_2, \ldots, 42_i$, where i is any number. System 10 includes terminals $20_1, 20_2, \ldots, 20_i$, having administration modules $42_1, 42_2, \ldots, 42_i$, connections $28_1, 28_2, \ldots, 28_i$, to servers $40_1, 40_n$ via communication network 30 coupled as shown in FIG. 1. In this example, each terminal 20 comprises a thin client equipped with a connection administration module 42 that allows efficient and reliable management of connections for a user of system 10. Specifically, each of terminals $20_1, 20_2, \ldots, 20_i$, where i is any number, has access to a connection administration module $42_1, 42_2, \ldots, 42_i$, respectively that is configured to associate a user with multiple connection groups and/or multiple failover connections to access one or more servers $40_{1-n}$, where n is any number. According to at least one embodiment, connection administration module $42_{1-i}$ is configured to associate with a user multiple connection groups, where each group comprises at least one failover connection. In some embodiments, connection administration module 42 may be described as a multi-connection and multi-failover connection administration module that provides multiple failover connections in multiple groups of connections.

Terminals $20_{1-i}$ allow the user to access one or more of servers $40_{1-n}$ via network 30 in order to receive a service from servers $40_{1-n}$. According to the illustrated embodiment, terminal $20_1$ comprises a thin client device that the user may use to access servers $40_{1-n}$ in order to execute applications $62_{1-n}$ stored to data storage $60_{1-n}$, respectively. Although in this example embodiment terminals $42_{1-i}$ are "thin clients," any device operable to provide access to applications $62_{1-n}$ of servers $40_{1-n}$ may be used. That is, while the connection management technique provided herein has particular applicability to thin clients, it may be used as well (or instead) with other types of clients. For example, a terminal 20 may, in certain implementations, comprise a personal computer (PC), work station, network computer, wireless data port, wireless telephone, personal digital assistant (PDA), a cellular telephone, a mobile handset, or any other suitable processing device.

According to the illustrated embodiment, each terminal 20 comprises a connection administration module 42 that allows management of server and application connections 28. In one embodiment, connection administration module 42 is part of an operating system (OS) process. For example, connection administration module 42 may be a process supported by the WINDOWS™ CE OS executing on terminal 20. Any other suitable OS may be adapted to implement connection administration module 42. Although the term "process" is used herein, connection administration module 42 is not limited to a particular embodiment of executable code.

Connection administration module 42 associates multiple connections with the user of a terminal 20. The multiple connections are grouped to form connection groups, each user being associated with at least one connection group and each connection group having at least one failover connection sub-group. Connection administration module 42 is operable to associate any number of connection groups to a given user, whereby the associated groups are available for use by the given user. For example, connection administration module 42 may associate two connection groups to a first user and one connection group to a second user, where each connection group comprises at least one failover connection sub-group. Thus, the primary and failover connections may be assigned on a per-user basis (e.g., per user group). The associations may be assigned according to the connection needs of a particular user, a particular group of users, or all the users of system 10. Management of connections in this manner may result in a more balanced load at each server 40 as well as providing more security because unnecessary connections are not provided to users. Additionally, system 10 may be designed to provide particular groups of users the connection needs particular to that group of users.

To illustrate the preceding, and not by way of limitation, a first group of users in an accounting department of an organization may desire a secure connection to server $40_1$ as a primary connection, while another group of users in the organization's sales department may desire a web connection to server $40_n$ as a primary connection. A primary connection is typically designated as the first connection in a connection group that terminal 20 attempts to use to establish connection 28. To manage these connections, connection administration module 42 may associate a first connection group to the users in the accounting department having in that first connection group a primary connection specified as a CITRIX connection. Similarly, connection administration module 42 may associate a second connection group to the users in the sales department having a primary connection specified as a WEB connection. In addition to a primary connection, both groups of users are associated with multiple failover connections, which may be grouped into a failover connection sub-group. A failover connection would be attempted in the event the primary connection fails. To illustrate further, the connection group associated with each group of users (accounting department and sales department) in the preceding example may be configured with one primary connection and at least one failover connection associated with the primary connection.

A failover connection may be established if the associated primary connection fails. As used in this document, a connection "failure" is intended to encompass any situation in which the connection is not usable by the requesting terminal 20, e.g., it may be overloaded by other connections established by other terminals, etc. Connection groups and connection associations will be described in more detail with reference to FIGS. 2-4.

Connections $28_{1-i}$ provide connection services to terminals $20_{1-i}$. For example, connection $28_1$ allows terminal $20_1$ to be coupled to any of servers $40_{1-n}$ through network 30, where terminal $20_1$ may use connection $28_1$ to receive a service from one or more servers $40_{1-n}$. In a particular embodiment, a connection 28 comprises a connection that a thin-client device uses to launch at least one of applications $62_{1-n}$ at servers $40_{1-n}$. For example, connection 28 may comprise a Remote Desktop connection (RDP), a CITRIX ICA connection, a WEB connection, or any other suitable types of connection.

In the present embodiment, connection $28_1$ is associated with terminal $20_1$, connection $28_2$ is associated with terminal $20_2$, and connection $28_i$ is associated with terminal $20_i$. Although one connection 28 is illustrated as being associated with a respective terminal 20, any suitable number of connections 28 may be used at each terminal 20. For example, terminal $20_1$ may be configured to establish multiple connections 28 in order to simultaneously use multiple communication services for accessing a server 40.

Network 30 couples terminals 20 and servers 40 via connections 28. Network 30 may comprise any communication network, such as a Local Area Network (LAN), a Wide Area Network (WAN), a Virtual Private Network (VPN), a Storage Access Network (SAN), a wireless network, a wired network, any other suitable communication network, or a combination of the preceding, as examples.

Servers 40 provide terminals 20 with access to applications 62. According to the illustrated embodiment, server $40_1$ provides access to applications $62_1$, while server $40_n$ provides access to applications $62_n$. Any suitable number and combination of servers may be used to provide terminals 20 with access to applications 62. An example of an embodiment having single server is described more particularly with reference to FIG. 2.

Each server 40 comprises at least one processor 70 and applications 62. In the present embodiment, processor $70_1$ executes instructions that may be accessed from storage $60_1$, while processor $70_n$ executes instructions that may be accessed from storage $60_n$. Although multiple servers 40 are illustrated, a single server 40 may be used in certain architectures. In the example of multiple servers 40, each server 40 may be associated with a specific service. For example, server $40_1$ may be a file server causing processor $70_1$ to execute applications $62_1$ that may be related to providing file service to terminals 20, while server $40_n$ may be a mail server configured to provide e-mail services to terminals 20. Any suitable combination of services and applications may be used at servers 40 and those services mentioned herein are by way of example only and are not intended to limit the scope of the subject matter claimed.

Modifications, additions, and omissions may be made to the example system 10 of FIG. 1. For example, as previously discussed, additional (or fewer) servers 40 may be used. As another example, more (or fewer) connections 28 may be used. As yet another example, each connection administration module 42 may be located elsewhere in system 10, such as at a server 40, or at another terminal 20, or at any another computing device. For example, rather than implementing connection administration module 42 at each individual terminal 20, connection administration module 42 may be implemented at a separate processor-based device that is communicatively accessible by terminals 20. Thus, terminals 20 may request a connection through such connection administration module 42 implemented on the separate processor-based device. Additionally, the connection management functions described herein may be performed using any suitable logic comprising, software, hardware, firmware, or any suitable combination of the preceding.

Figure 2:
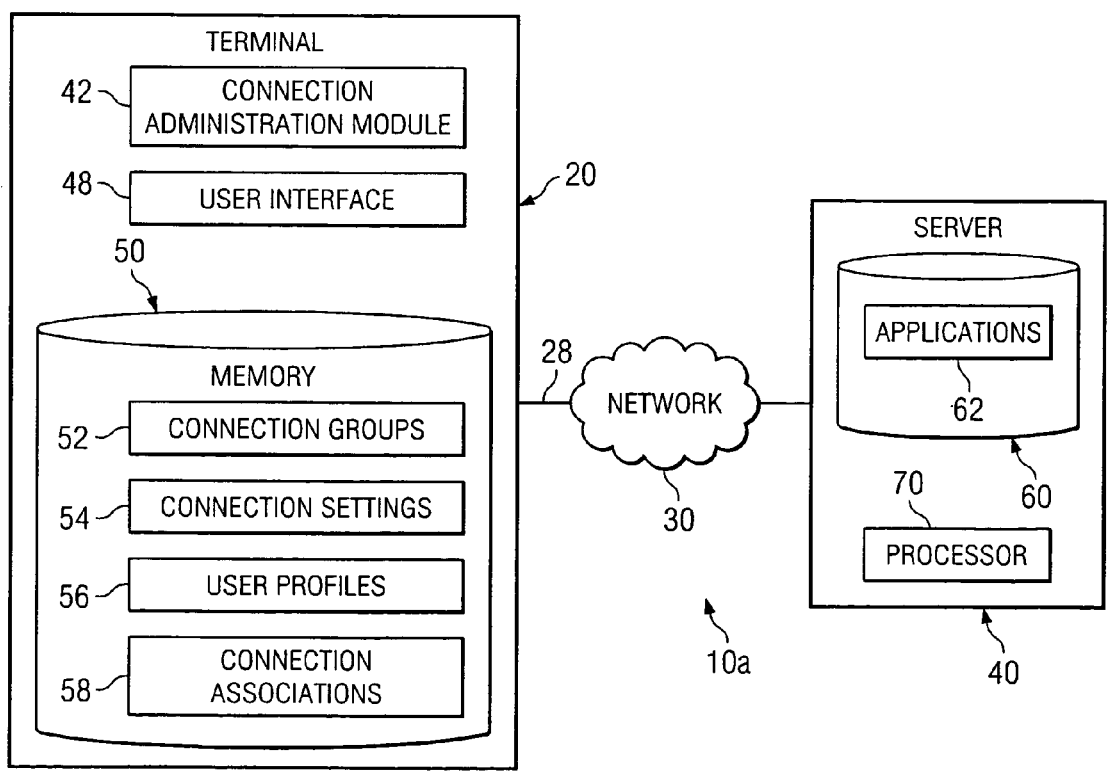
FIG. 2 is a block diagram illustrating an example of an embodiment of a system for managing connections using a connection administration module.

FIG. 2 is a block diagram illustrating in greater detail one embodiment of system 10, shown as system 10a for managing connections using connection administration module 42. In general, the illustrated system 10a shows more detail with respect to one embodiment of terminal 20. A single-server scenario is also shown in this example. Terminal 20 includes connection administration module 42 and memory 50 that includes information specifying connection groups 52, connection settings 54, and connection associations 58.

According to one embodiment, connection administration module 42 provides a user interface 48, sets up connection groups 52, and accesses connection settings 54 and connection associations 58 in order to provide multiple connections and at least one failover connection to a user. In other embodiments, multiple failover connections are provided for each user. In this example, user interface 48 provides the user of terminal 20 with a shell that the user may use to access a kernel associated with the OS of terminal 20. Once connected with the kernel, the OS of terminal 20 may provide basic services in addition to facilitating the loading and execution of applications that may reside either at terminal 20 or server 40. In some instances, user interface 48 is configured so that the user is not allowed to directly access the OS of terminal 20. For instance, such user interface 48 may be configured in a "kiosk mode". A "kiosk mode" may be described as a configuration that enables terminal 20 to boot up and start automatically a predefined application, therefore not allowing the user to access the OS or to access applications not specifically loaded up. In other instances, user interface 48 is configured to provide the user with a WINDOWS "look and feel" by loading upon startup a WINDOWS™ EXPLORER shell. In certain embodiments, the user interface 48 can be selectively configured to any of a plurality of different shells. The abovementioned instances are provided by way of example only, and are not intended to limit the scope of the subject matter herein disclosed.

Memory 50 stores connection groups 52, connection settings 54, and user profile 56. In one embodiment, memory 50 comprises any storage device communicatively accessible by terminal 20, such as a hard drive, read only memory (ROM), random access memory (RAM), virtual memory, flash memory, cache memory, or any combination of the preceding, as examples. In certain embodiments, memory 50 is local to terminal 20, while in other embodiments memory 50 is not located at terminal 20. For example, memory 50 may reside at server 40, network 30, or any other computer that may be used with system 10 with which terminal 20 is operable to at least temporarily communicatively connect.

Connection administration module 42 accesses connection groups 52. As was described with reference to FIG. 1, connection administration module 42 accesses connection groups 52 associated with a particular user to manage connection establishment for terminal 20. According to one embodiment, connection administration module 42 accesses two connection groups 52 associated with a user. Each connection group 52 may be configured to include a primary connection and multiple failover connections grouped in a failover connection sub-group. The primary connection may be selected according to the needs of the user, group of users, or all users of system 10, as was described with reference to FIG. 1. The failover connections may be associated with the user based on loading criteria, user preferences, by default, random selection, or by any other suitable criteria. For example, connection groups 52 may be configured by default to have a primary connection designated as a particular WEB connection and having other WEB connections as failover connections. As another example, connection groups 52 may be configured by default to have a primary connection designated as the CITRIX connection and having failover connections designated as a WEB connection and RDP connection. The preceding connection group 52 may be stored as the default for a particular user, a particular group of users, or all users of system 10. Another connection group may be configured with all available connections, which will be established in a random manner, as an example.

Connection administration module 42 accesses connection settings 54 to allow connections 28 to be configured in a certain fashion. That is, each connection in connection groups 52 may have associated therewith a respective connection settings 54. For example, a connection setting 54 may provide the option of automatically attempting to establish connection 28 when launching an application. As another example, a connection setting 54 may provide the option of automatically attempting to reestablish connection 28 if a failure is detected. As yet another example, a connection setting 54 may provide the option of pinging server 40 to ensure availability of server 40 before attempting to establish a connection. This particular "ping before" option may be a useful connection setting 54, because the connection process may take an indeterminate amount of time and other connections 28 in a connection group 54 may be attempted if the ping is not successful.

As yet another example, a connection setting 54 may provide the option of prompting before attempting to establish a connection 28. This particular "prompt before connect" option causes a prompt to be displayed to the user to request an acknowledgement from the user before attempting to reconnect. If the user does not acknowledge that a reconnection is needed, a reconnect sequence to attempt to reestablish connection 28 will not be performed. In other words, the user may be, for example, away from terminal 20 such that connection 28 is not needed at that time. The "prompt before connect" option of connection settings 52 may result in a reduction of the load at server 40, which may reduce the costs of operating the network and improve response time from server 40.

As yet another example, a connection setting 54 may provide the option of randomizing the order of attempting to establish a connection 28 from a connection group. For example, a connection group may be configured with five connections, where any of the five connections may be attempted as a primary connection with the remainder of the connections in the group designated as failover connections. One process for randomizing the order may be used to select the primary connection from the connection group 52, while another process may be used to select the order of the failover connections. The random orders used for each process may be performed using any suitable criteria. Additionally, the option of randomizing may be set as a default connection setting. In fact, any of the options comprising connection settings 54 may be set as a default connection setting.

Connection administration module 42 accesses user profiles 56 and connection associations 58 to manage establishment of connection 28. User profiles 56 may comprise a set of parameters that connection administration module 42 may use to establish connection 28 for each user of terminal 20. Each user of terminal 20 may be associated with a respective user profile 56. For example, terminal 20 may be configured for use by two users, where each user is associated with a particular user profile 56. Although one user profile 56 is illustrated, terminal 20 may comprise any suitable number of user profiles 56.

According to the illustrated embodiment, connection associations 58 comprises a set of associations that connection administration module 42 may use to establish connection 28. Connection associations 58 define how connection groups are associated with the user. For example, a user may be associated with two connection groups, where each group is designed with particular primary and failover connections. Default associations may be used as connection associations 58 such as when a default connection group has been associated with a particular user, a group of users, or all users of system 10. User profile 56 may comprise any suitable number of connection associations 58 for each user and may comprise any other suitable set of parameters to allow connection administration module 42 to manage connections. Examples of connection associations 58 that may be used with system 10 are more particularly described below with reference to FIGS. 4A and 4B.

In the example of FIG. 2, terminal 20 is shown coupled to server 40 to illustrate the operation of a single terminal connecting to a single server. Server 40 comprises a processor 70 and storage 60 for storing applications 62. Terminal 20 uses connection 28 to access applications 62 that are executed by processor 70. Although server 40 is shown as the sole repository of applications 62, additional servers 40 having corresponding applications 62 may be included at system 10. While the term "applications" is used with respect to data services requested by terminal 20, the operation of connection administration module 42 is in no way limited to accessing software programs, processes, or executable files. Terminal 20 may request any other suitable data service from server 40. For example, terminal 20 may request authentication, updates of user profile 56, and downloads of user interface 48.

Modifications, additions, and omissions may be made to the example of system 10*a*. For example, terminal 20 may be illustrated as comprising a local processor for processing instructions locally. As another example, memory 50 may store other suitable data that connection module 42 may use to manage a connection 28. As yet another example, user interface 48 may be omitted if terminal 20 is to operate in a kiosk mode.

Figure 3:
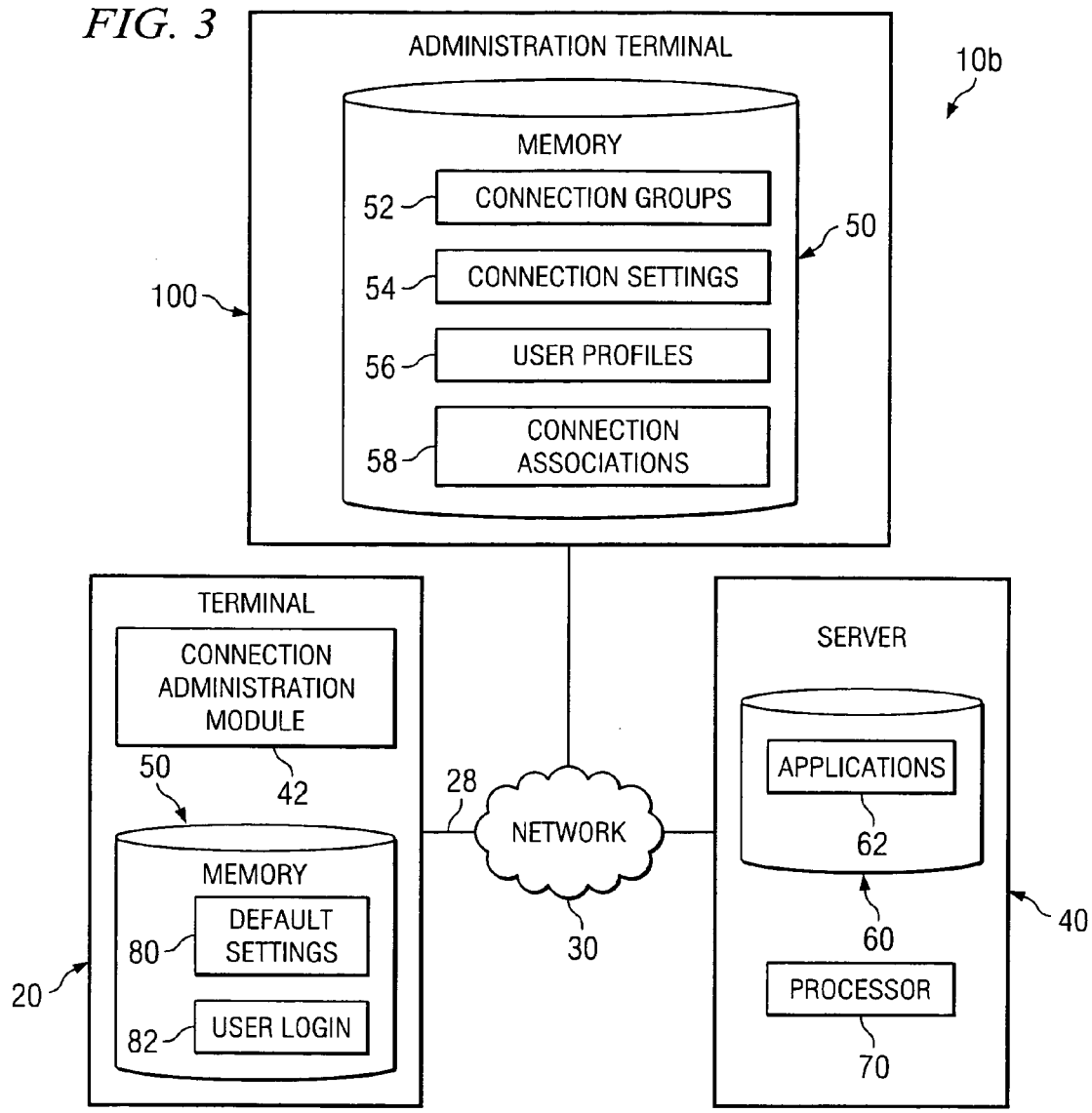
FIG. 3 is a block diagram illustrating another example of an embodiment of a system for managing connections using a connection administration module.

FIG. 3 is a block diagram illustrating another example of an embodiment of system 10, shown as system 10*b*, for managing connections using connection administration module 42. Terminal 20 is communicatively coupled to an administration terminal 100 and server 40 using network 30, as shown. According to the present embodiment, terminal 20 includes connection administration module 42 and memory 50 in order to connect to server 40, and to communicate with administration terminal 100. Terminal 20 communicates with administration terminal 100 to access settings other than the default settings 80. For example, upon boot up terminal 20 may be capable of connecting using a specific connection 28 that has been configured as a default setting 80 to access connection settings 54, connection groups 52, and connection associations 58 stored at administration terminal 100 in order to establish another connection 28 (e.g., to server 40) that is not set by default.

Default settings 80 and user login 82 are stored at memory 50 in order for terminal 20 to establish an initial connection 28, and access server 40 and administration terminal 100. Default settings 80 comprise any default information suitable for terminal 20 to establish a default connection 28. According to the illustrated embodiment, default settings 80 comprise a default group, a default connection setting, a default connection association, or some, none, or a combination of the preceding. User login 82 comprises any script, data, user identification, user password, or any other suitable information that the user may use to log in to terminal 20.

Administration terminal 100 is used by an administrator of system 10 to manage terminal 20, server 40, and connection 28. For example, the administrator configures terminal 20 remotely by setting connection groups 52, connection settings 54, and connection associations 58 at administration terminal 100. Administration terminal 100 may also be used to ensure that user login 82 corresponds to the appropriate user of terminal 100. According to the illustrated embodiment, administration terminal 100 comprises a computer equipped with an operating system configured to provide administrator level access to an administrator logged in to system 10. The administrator manages user access by associating a user profile 56 with user login 82. User profile 56 includes connection associations 58 in order for terminal 20 to attempt to establish connection 28 using connection groups 52 and connection settings 54. Although user profile 56 is illustrated as stored at administrator terminal 100, user profile 56 may be located locally at terminal 20 as shown in other embodiments.

Modifications, additions, and omissions may be made to the example of system 10*b*. For example, memory 50 may store other suitable data that connection module 42 may use to manage a connection 28. As yet another example, connection groups 52, connection settings 54, and user profiles 56 may be stored at server 40, or any other suitable computer of system 10. In certain implementations, as information is updated at terminal 100, the information may be pushed to terminal 20. Additionally, connection administration module 42 may be implemented in whole or in part at terminal 100.

Figure 4A:
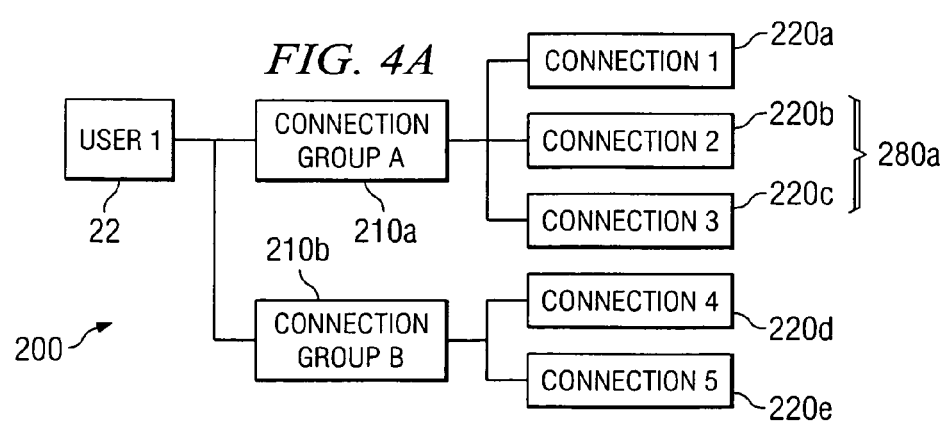
FIGS. 4A-4B are block diagrams illustrating examples of connection associations that may be used with a connection administration module.
Figure 4B:
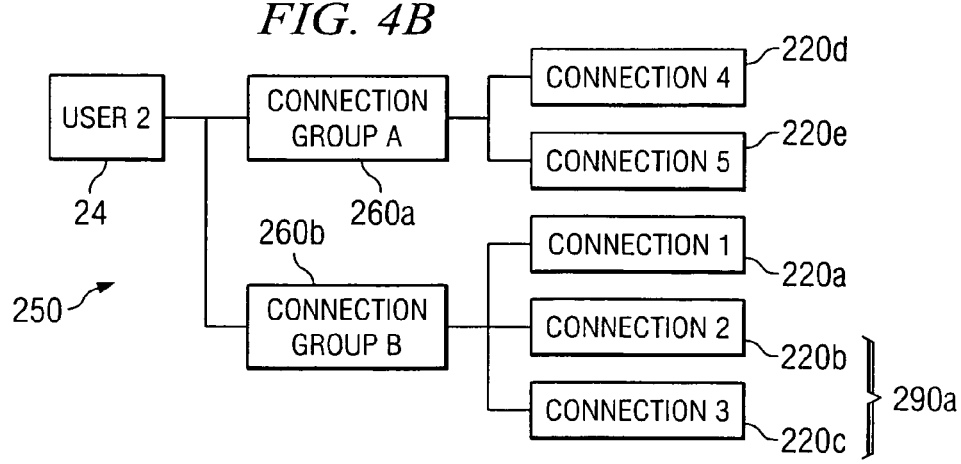

FIGS. 4A-4B are block diagrams illustrating examples of connection associations 200 and 250 that may be used with a connection administration module. In FIG. 4A, first user 22 is associated with a connection group A 210*a* and a connection group B 210*b*, while in FIG. 4B, a second user 24 is associated with a connection group A 260*a* and a connection group B 260*b*. Although it is shown that two connection groups 210 and 260 are associated with each user, any suitable number of connection groups 210 and 260 may be associated with a given user. For example, user 22 may be associated with a third connection group (not shown), while user 24 remains associated with the illustrated connection groups 260*a*-260*b*.

In FIGS. 4A-4B, connection identifiers 220*a-e* represent the type of connections available at system 10 for use by terminal 20. For example, connection identifier 220*a* may represent a CITRIX connection, while a connection identifier 220*b* represents a WEB connection. Although five types of connections are shown as available connections, system 10 may be designed to include any suitable number of given type of connections. Additionally, some types of connections may be similar to other types of connections. For example, connection identifiers 220*a* and 220*d* may both represent a CITRIX type of connection.

Referring now to FIG. 4A, each connection group 210 is associated with multiple connection identifiers 220. For example, connection group 210a is associated with connection identifiers 220a, 220b, and 220c, while connection group 210b is associated with connection identifiers 220d and 220e. For connection group 210a, connection identifier 220a may be described as a primary connection, while connection identifiers 220b and 220c may be described as failover connections. Similarly, for connection group 210b, connection identifier 220d may be described as the primary connection, while connection identifier 220e may be described as a failover connection. According to the illustrated embodiment, connection identifiers 220b and 220c are grouped to form failover connection group 280a within the connection group A 210a.

Referring now to FIG. 4B, each connection group 260 is associated with multiple connection identifiers 220. The association of connection identifiers 220 with each connection group 210 may be performed differently for each user. For example, connection group 260a is associated with connection identifiers 220d and 220e, while connection group 260b is associated with connection identifiers 220a, 220b, and 220c. For connection group 260a, connection identifier 220d may be described as a primary connection, while connection identifier 220e may be described as a failover connection. Similarly, for connection group 260b, connection identifier 220a may be described as the primary connection, while connection identifiers 220b and 220c may be described as failover connections. According to the illustrated embodiment, connection identifier 220b and 220c may be grouped to form failover connection group 290a.

The illustrated associations of FIGS. 4A and 4B exemplify how connection associations 58 may be associated. However, these associations may be subject to parameters of connection settings 54. For example, first user 22 may be configured to randomize the order of the connection attempts so that even though the associations may be configured as illustrated in FIG. 4A, the actual order that connection administration module 42 uses to attempt the connections may be unrelated to the associations. That is, connection associations 58 are subject to connection settings 54.

Although some connection groups may be illustrated as comprising one failover connection, the embodiment allows for multiple connection groups, where each group is associated with multiple connections and multiple failover connections. Connection administration module 42 manages connections using the multiple connection groups and multiple failover connections in order to improve supervision of operation costs, connection loading, and reliable connections 28.

Figure 5:
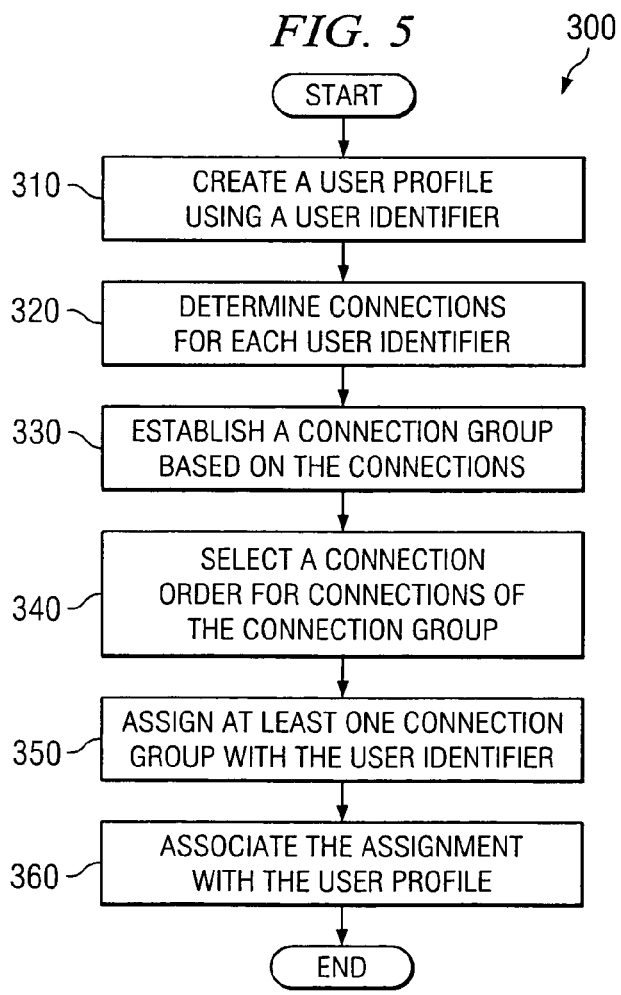
FIG. 5 is a flowchart illustrating the operational flow of one embodiment for managing communications using the connection administration module that may be used with the system of FIGS. 1, 2, and 3.

FIG. 5 is a flowchart illustrating the operational flow of an example of a method 300 for managing communications using the connection administration module 42 that may be used with the system of FIGS. 1, 2, and 3. According to one embodiment, connection administration module 42 manages establishment of connection 28 by accessing connection groups 52 and connection associations 58 from connections available at system 10. The method begins at step 310, where a user profile is created. According to one embodiment, the user profile is substantially similar to the user profile 56 that was described with reference to FIG. 3. This user profile is associated with a user identifier (e.g., user group identifier) and may be used, for example, to provide access rights to the corresponding user. The user profile may also be configured to assign each user a connection association 58.

A user identifier may comprise a user identification number, data stream, or passcode, a user name, keyword, user designation, or some other suitable identification that represents the user. For example, the user may log in to terminal 20 with a user identifier comprising the user's name and a password. The user identifier may be recognized by server 40 as being a valid user identifier and therefore may grant access rights to the user according to the rights specified in the user profile.

At step 320, connections are determined for each user identifier. As was described with reference to FIG. 2, the connections available at system 10 may be grouped to form connection groups 52. An administrator, as was described with reference to FIG. 3, may determine the connections to associate with each user. According to one embodiment, connection administration module 42 randomly selects the connections to associate with each user. According to another embodiment, connection administration module 42 lists, in the form of a connections tree, all application connections and servers 40 available at system 10 in order to identify connections for each user.

A connection group 52 is established based on the connections at step 330. According to one embodiment, connection group 52 may be determined by associating multiple connections to a user profile. In addition to connection groups 52, each user profile may also be associated with a failover connection group formed by grouping the failover connections. According to another embodiment, connection administration module 42 may list the failover connections and associated connection groups 52 in a failover connection groups tree.

The method proceeds to step 340, where a connection order for the connections of the connection group 52 is selected. According to one embodiment, connection administration module 42 determines the primary connection and failover connection group from connection association 58 and connection groups 52. Connection administration module 42 determines how to establish a connection 28 according to connection associations 58 and connection settings 54. The connection order may be selected according to connection settings 54 as was described with reference to FIG. 2. For example, the connection order may be selected accordingly to the option of randomizing the order of the connections in the connection group 52. As yet another example, although the order may be selected according to the connection associations 58, the option of prompting before connecting may be selected so that connection administration module 42 notifies the user before connecting.

At step 350 at least one connection group 52 is assigned to the user identifier. According to one embodiment, connection administration module 42 lists the connection groups 52, including the corresponding failover connection group, in a profiles tree. This profiles tree lists each user profile and the assigned failover connection groups. Any suitable number of connection groups 52 and their corresponding failover connection groups may be assigned to a user identifier, and thus a user. The assignments are associated with the user profile at step 360. As explained above, the connection group may be associated with each user profile by way of listing the association in a profiles tree. Connection administration module 42 may provide other displays that list the associations, assignments, and selections described with reference to method 300. For example, instead of using a tree list, connection administration module 42 may use table formats, charts, drop-down boxes, or any other suitable display format. After associating the connection group assignments with the user profile at step 360, the method terminates.

Modifications, additions, or omissions may be made to method 300. For example, a step of selecting connection settings 54 for each connection, failover connection group, or user profile may be added after assigning at least one connection group with the user identifier at step 350. Additionally, steps may be performed in any suitable order. For example, the step of assigning at least one connection group 52 with the user identifier at step 350 may be performed substantially simultaneously with associating the assignment with the user profile at step 360.

FIG. 6 is a flowchart illustrating the operational flow of another example of a method 500 for managing connections using connection administration module 42. Method 500 may be used to establish a connection 28 according to connection associations 58, connection groups 52, and connection settings 54. The method begins at step 510, where connection administration module 42 receives a user identifier. At step 520 connection administration module 42 determines the connections for the user identifier. The determination may be performed by reading a default file where the connections available at system 10 are listed. Any other suitable process may be used to determine the connections available at system 10. For example, in a certain embodiment, an administrator of system 10 may setup connection administration module 42 with the connections available for the user.

The method proceeds to step 530, where the available connections for the user are grouped into connection groups 52. Connection groups 52 are assigned connection settings 54 at step 540. According to one embodiment, each connection group 52 is assigned a connection setting 54. For example, a connection group 52 comprising multiple connections may be associated with a prompt before connect option so that the user may acknowledge the desire for a connection before a new connection is attempted.

At step 550, the connection group 42 designates a primary connection and failover connections in a connection group. Connection administration module 42 may be configured to associate with the a user profile at least one connection group comprising multiple connections, where one connection is designated as the primary connection and the remaining connections in the group are designated as failover connections. The failover connections may be grouped into a defined failover connection group that connection administration module 42 may associate with the user.

Connection administration module 42 initiates the attempt of using the primary connection to establish connection 28 at step 560. According to one embodiment, if the connection settings 54 associated with the connection group 52 indicate a prompt before connect option, connection administration module 42 initiates the display of a prompt to the user that must be acknowledged before the primary connection is attempted. If the primary connection fails at step 565, the method proceeds to step 570, where connection administration module 42 initiates the attempt of establishing connection 28 using a failover connection.

If the failover connection attempt fails, at step 565, the method continues attempting to establish connection 28 using the failover connections corresponding to the connection group 52. If the connection does not fail at step 565, the method proceeds to step 580 where connection 28 is established and maintained. After maintaining connection 28, the method terminates.

Method 500 may be modified, such as by omitting and adding steps. For example, step 550 of designating a primary connection and failover connections in a group may be omitted such as when the randomizing order option is selected as connection settings 54. Randomizing the selection of a first connection and the subsequent failover connections obviates the need to designate a primary connection and a failover group. As another example, a step may be added after receiving the user identifier 510 where connection administration module 42 determines the access rights and the connection groups 52 associated with the user. As yet another example, grouping connections into connection groups 52 at step 530 may be omitted if connection administration module 42 is configured to automatically associate a default connection group 52 with the user identifier. Additionally, steps may be performed in any suitable order. For example, assigning connection settings 54 to each connection group 52 at step 540 may be performed after designating a primary connection and failover connections in a group at step 550.

FIG. 7 is a flowchart illustrating the operational flow of another example of a method 700 for managing connections using connection administration module 42. The method begins at step 710, where a plurality of connections are grouped to form at least two connection groups. Each connection is associated with a communication service and each connection group comprises a first connection and at least one failover connection operable to establish a new communication service if the communication service associated with the first connection fails. The method then proceeds to step 720, where the at least two connection groups are associated with a user identifier.

In view of the above, certain embodiments provide a system and a method that allow for a plurality of connection groups to be defined where each group includes a primary connection and at least one corresponding failover connection. The group may be defined on a per user basis allowing each user to be configured according to selected criteria. In certain embodiments, a connection group comprises a failover connection sub-group that includes multiple failover connections. This failover connection sub-group comprises multiple failover connections that are used in attempts to establish a connection if the connection designated as a primary connection fails. In a particular embodiment, the association of connection groups to a given user also includes associating connection settings that enable the user to receive a prompt notifying that the previously established connection has failed and that another connection may be attempted. Additionally, connection settings make it possible to randomize the order in which the multiple connections in a connection group, and thus within a failover connection sub-group, are attempted.

What is claimed is:

1. A computer implemented method to manage a plurality of connections between one or more resources accessible via a computer network and one or more users of the computer network, the method comprising:
grouping a plurality of connections between the one or more resources and the one or more users of the computer network to form at least two connection groups,
wherein each connection is associated with a communication service;
wherein each connection group comprises a first connection having a first connection type and at least one failover connection having a second connection type, different from the first connection type, and operable to establish a new communication service if the communication service associated with the first connection fails;
associating the at least two connection groups with a user identifier; and
storing the connection groups in a computer readable memory module.

2. The method of claim 1 wherein at least one connection group associated with the user identifier comprises a primary connection and a plurality of failover connections.

3. The method of claim 2 further comprising:
grouping the plurality of failover connections to form a failover connection group; and
associating the failover connection group with a connection setting operable to establish how the plurality of failover connections in the failover connection group are executed.

4. The method of claim 1 further comprising establishing a connection for a connection group using at least one connection group according to a connection setting.

5. The method of claim 4 wherein the connection setting comprises a prompt option operable to:
initiate the display of a prompt to a user;
request input from the user indicating acknowledgement of a request for connection; and
initiate the connection request in response to the received input.

6. The method of claim 4 wherein the connection setting comprises a randomize option for randomly selecting the first connection and the at least one failover connection.

7. The method of claim 1 wherein associating the at least two connection groups with the user identifier further comprises:
receiving the user identifier;
creating a user profile corresponding to the user identifier; and
assigning to the user profile at least two connection groups.

8. A computer based system to manage a plurality of connections between one or more resources accessible via a computer network and one or more users of the computer network, the system comprising:
a plurality of connections comprising a plurality of connection groups, each connection associated with a communication service and each connection group comprising a first connection having a first connection type and at least one failover connection having a second connection type, different from the first connection type, to establish a new communication service if the communication service associated with the first connection fails; and
a connection administration module to group the plurality of connections between the one or more resources and the one or more users of the computer network to form the plurality of connection groups.

9. The system of claim 8 wherein at least one connection group associated with the user identifier comprises a primary connection and a plurality of failover connections.

10. The system of claim 8 wherein the connection administration module:
groups a plurality of failover connections to form a failover connection group; and
associates the failover connection group with a connection setting to establish how the plurality of failover connections in the failover connection group are executed.

11. The system of claim 8 further comprising a processor to establish a connection for a connection group using at least one connection group according to a connection setting.

12. The system of claim 11 wherein the connection setting comprises a prompt option to:
initiate a display of a prompt to a user;
request input from the user indicating acknowledgement of a request for connection; and
initiate the connection request in response to received input.

13. The system of claim 11 wherein the connection setting comprises a randomize option for randomly selecting the first connection and the at least one failover connection.

14. The system of claim 9 further comprising a processor to:
receive the user identifier;
create a user profile corresponding to the user identifier;
assign to the user profile at least two connection groups; and
store in memory the user profile in memory.

15. A system for managing a plurality of connections, the system comprising:
at least one server to provide data services to a plurality of users; and
at least one client comprising:
a plurality of connections for communicatively coupling to the at least one server, the plurality of connections grouped into at least two connection groups where each connection group comprises a primary connection having a first connection type and at least one failover connection having a second connection type, different from the first connection type; and
a connection administration module operable to associate at least two connection groups with a user identifier.

16. The system of claim 15 wherein the at least two connection groups comprise a primary connection and a plurality of failover connections grouped to form a failover connection group.

17. The system of claim 15 wherein:
the at least one client comprises a second plurality of connections grouped into another at least two connection groups;
the at least two connection groups are associated with a first user identifier of a plurality of user identifiers; and
the another at least two connection groups are associated with a second user identifier of the plurality of user identifiers.

18. The system of claim 15 wherein the at least one client comprises a connection setting operable to establish how the plurality of connections of the at least two connection groups are used to communicatively couple the at least one client with the at least one server.

19. The system of claim 18 wherein the connection setting comprises a prompt option to:
initiate the display of a prompt to a user;
request input from the user indicating acknowledgement of a request for connection; and
initiate the connection request in response to received input.

20. The system of claim 18 wherein the connection setting comprises a randomize option for randomly selecting the primary connection and the at least one failover connection.

21. The method of claim 1, wherein the first connection comprises a connection selected from the group consisting of a web connection, a CITRIX ICA connection, a Remote Desktop ("RDP") connection, and a connection to a local client or server-based application; and
wherein the failover connection comprises a connection selected from the group consisting of a web connection, a CITRIX ICA connection, a Remote Desktop (RDP) connection, and a local client or server-based application.

22. The system of claim 8, wherein the first connection comprises a connection selected from the group consisting of a web connection, a CITRIX ICA connection, a Remote Desktop ("RDP") connection, and a connection to a local client or server-based application; and
wherein the failover connection comprises a connection selected from the group consisting of a web connection, a CITRIX ICA connection, a Remote Desktop (RDP) connection, and a local client or server-based application.

23. The system of claim 15, wherein the first connection comprises a connection selected from the group consisting of a web connection, a CITRIX ICA connection, a Remote Desktop ("RDP") connection, and a connection to a local client or server-based application; and wherein the failover connection comprises a connection selected from the group consisting of a web connection, a CITRIX ICA connection, a Remote Desktop (RDP) connection, and a local client or server-based application.

\* \* \* \* \*